US006930988B2

(12) United States Patent
Koodli et al.

(10) Patent No.: US 6,930,988 B2
(45) Date of Patent: Aug. 16, 2005

(54) METHOD AND SYSTEM FOR FAST IP CONNECTIVITY IN A MOBILE NETWORK

(75) Inventors: Rajeev Koodli, Sunnyvale, CA (US); Charles E. Perkins, Saratoga, CA (US)

(73) Assignee: Nokia Corporation, Espoo (FI)

(*) Notice: Subject to any disclaimer, the term of this patent is extended or adjusted under 35 U.S.C. 154(b) by 118 days.

(21) Appl. No.: 10/282,926

(22) Filed: Oct. 28, 2002

(65) Prior Publication Data

US 2004/0081122 A1 Apr. 29, 2004

(51) Int. Cl.[7] .............................. H04Q 7/00; H04B 7/00; H04L 12/56; H04L 12/28
(52) U.S. Cl. .................... 370/331; 370/310.2; 370/392; 370/469
(58) Field of Search ............................... 370/331, 315, 370/328–329, 465, 475, 389, 392, 397, 310, 310.2, 469; 455/432, 436–440

(56) References Cited

U.S. PATENT DOCUMENTS

| | | | | |
|---|---|---|---|---|
| 6,418,310 | B1 * | 7/2002 | Dent ........................... | 455/418 |
| 6,502,137 | B1 * | 12/2002 | Peterson et al. ............. | 709/229 |
| 6,580,727 | B1 * | 6/2003 | Yim et al. ................... | 370/463 |
| 6,771,635 | B1 * | 8/2004 | Vilander et al. ............ | 370/349 |
| 2001/0044305 | A1 * | 11/2001 | Reddy et al. ............... | 455/436 |
| 2002/0039357 | A1 * | 4/2002 | Lipasti et al. .............. | 370/338 |
| 2003/0026230 | A1 * | 2/2003 | Ibanez et al. ............... | 370/338 |
| 2003/0081578 | A1 * | 5/2003 | White et al. ................ | 370/338 |
| 2003/0092425 | A1 * | 5/2003 | Okazaki et al. ............. | 455/411 |

OTHER PUBLICATIONS

Bellcore, S. Thomson, T. Narten, "IPv6 Stateless Address Auto configuration," Dec. 1998. *Network Working Group, Internet Draft*, pp 1–25.
Palet, Jordi. "IPv6 Tutorial: ICMPv6 & Neighbor Discovery," *Education, Promotion and Awareness WG IPV6 Forum*, Counsul Tel, Consultores Integrales en Telecommicaciones, pp 1–38.
Koodli, Rajeev. "Fast Handovers for Mobile IPv6," Jul. 1, 2002, expires Jan. 1, 2003, *Mobile IP Working Group, Internet Draft*, Nokia Research Center, pp 1–49.
Koodli, Rajeev, Perkins Charles E. "Fast Handovers in Mobile IPv6," Oct. 5, 2000, expires Apr. 5, 2001, *Mobile IP Working Group, Internet Draft*, Communication Systems Laboratory of the Nokia Research Center, pp. i, 1–6.
Narten, T., Nordmark, E., Simpson, W. "Neighbor Discovery for IP Version 6 (IPv6)," Dec. 1998. *The Internet Society*, pp 1–57.
Dommety, G., Yegin, A., Perkins, C., Tsirtsis, G., El–Malki, K., Khalil, M. "Fast Handovers for Mobile IPv6," Mar. 2002, expires Sep. 2002. *Mobile IP Working Group*, Internet Engineering Task Force (IETF), 65 pages.
Dommety, "Fast Handovers for Mobile IPV6," Jul. 1, 2002, Mobile IP Working Group, pp. 1–15.
International Search Report for PCT/IB03/04473 from ISA/US, dated Mar. 26, 2004.

* cited by examiner

*Primary Examiner*—Chi Pham
*Assistant Examiner*—Ronald Abelson
(74) *Attorney, Agent, or Firm*—Darby & Darby P.C.; Jamie L. Wiegand

(57) ABSTRACT

An apparatus, system, and method are directed to managing connectivity in a network by expediting the ability of a mobile node to send Internet Protocol (IP) packets subsequent to a handover. The mobile node is configured to determine an unconfirmed address for use on an access router. Upon establishing a link-layer connection, and before establishing a network-layer connection with the access router, the mobile node employs the unconfirmed address to send an IP packet to the access router. Employing the unconfirmed address prior to network-layer connectivity enables the reduction of handover latencies. If the access router determines that the unconfirmed address conflicts with an existing address, the access router provides a message to the mobile node indicating the conflict in addresses. In response to the message, the mobile node performs actions to resolve the address conflict.

31 Claims, 4 Drawing Sheets

METHOD AND SYSTEM FOR FAST IP CONNECTIVITY IN A MOBILE NETWORK

FIELD OF THE INVENTION

The present invention relates to network routing, and more particularly to a system and method for managing connectivity in a mobile network.

BACKGROUND OF THE INVENTION

The mobile Internet Protocol (IP) enables a mobile node to move freely from one point of connection to another in various networks it visits along its route. In particular, the mobile IP protocol describes those actions that enable a mobile node to maintain connectivity during a handover from one access router to another access router.

During a typical handover of the mobile node, there may be a period of time when the mobile node is unable to send or receive IP packets. This time period is referred to as handover latency. In many situations, the handover latency may be unacceptable to support real-time, or otherwise delay sensitive network traffic.

There are many sources of handover latencies that contribute to how quickly the mobile node is able to regain IP connectivity so that it may communicate IP packets. One source of handover latency arises when the mobile node seeks to form a new topologically correct IP address with an access router. This procedure, known as Neighbor Discovery (ND), may contribute to significant latencies, such as when performed over cellular network links.

Neighbor Discovery (ND) typically involves either a stateless auto-configuration, in which the mobile node formulates an IP address by combining a network prefix advertised by a current access router, or a stateful configuration, in which the mobile node obtains an IP address through a server such as a Dynamic Host Configuration Protocol (DHCP) server. In any event, the mobile node typically ensures the uniqueness of the IP address by performing a Duplicate Address Detection (DAD), and router discovery procedures. Such actions however, typically contribute to significant latencies.

Another source of latency occurs when the mobile node attempts to inform a correspondent, or a home agent of its new IP address. Such mobile IP signaling actions may also result in transmission latencies.

Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to an apparatus, system, and method for managing connectivity in a network by expediting the ability of a mobile node to send Internet Protocol (IP) packets subsequent to a handover. Upon establishing a link-layer connection, and before establishing a network-layer connection with a confirmed address (henceforth known as network-layer connectivity), the mobile node employs an unconfirmed address to send an IP packet to the access router. Employing the unconfirmed IP address prior to network-layer connectivity is directed to reducing of handover latencies that may arise during duplicate address detection (DAD), and the like.

In one aspect of the invention, an apparatus is directed to managing connectivity in a network. The apparatus includes a network interface, and a mobile node. The network interface employs a packet-based protocol to send and receive packets. The mobile node is configured to determine an unconfirmed address. If the mobile node is handed over to a router, the mobile node is further configured to employ the network interface to provide a packet including the unconfirmed address to the router, prior to establishing a network-layer connection with the router.

Another aspect of the invention is directed to an apparatus for managing connectivity in a network. The apparatus includes a network interface and a router. The network interface is configured to send and receive packets. The router is configured to enable a mobile node to connect to the network. The router receives a packet associated with the unconfirmed address, from the mobile node over the network interface. The router determines if the unconfirmed address conflicts with another address, and provides a message to the mobile node if the unconfirmed address conflicts with another address. In response to the message, the mobile node configures a different address.

Still another aspect of the invention is directed to a system for managing connectivity in a network. The system includes a network interface, a mobile node, and a router. The network interface is configured to send and receive packets. The mobile node is configured to determine an unconfirmed address, and to provide a packet associated with the unconfirmed address over the network interface. The router is configured to establish link-layer connectivity with the mobile node, and to receive the packet associated with the unconfirmed IP address from the mobile node before network-layer connectivity is established with the mobile node. The router is further configured to determine if the unconfirmed address conflicts with another address, and if the unconfirmed address conflicts with another address, to provide a message to the mobile node, such that the mobile node determines a different address in response to the message.

Yet another aspect of the invention is directed to a method for managing connectivity in a network. The method enables a requesting entity to determine if an unconfirmed address conflicts with an address in use on the router's interface. The method further provides a packet to the router before a network-layer connection is established between the router and a mobile node. The provided packet includes an unconfirmed address. The packet associated with the unconfirmed address is received from the requesting entity, and a determination is made if the unconfirmed address conflicts with another address. If the unconfirmed address conflicts with another address, a message is provided to the requesting entity, such that the requesting entity may inform the mobile node to employ a different address.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
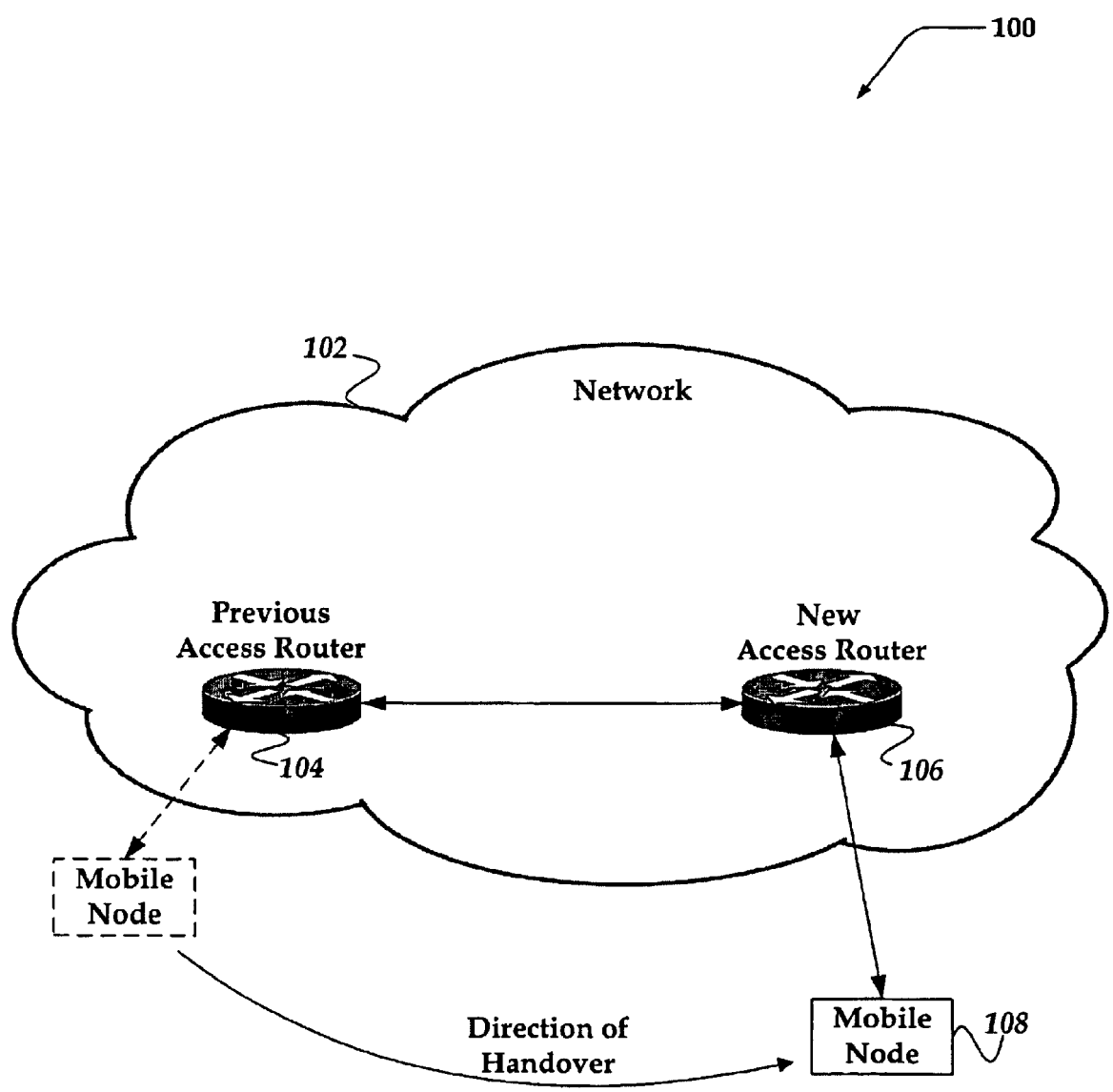
FIG. 1 illustrates a block diagram generally showing an overview of one embodiment for a mobile system.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The term "router" refers to a dedicated network element that receives packets and forwards them towards a destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a mobile node for providing IP connectivity between the mobile node and other nodes on an IP network, such as a correspondent node. Although the access router is a dedicated network element coupled to an IP network, it may also be in communication with one or more points of attachment for a wireless network.

The term "Mobile Node" refers to a wireless device that changes its point of attachment from one network or subnetwork to another. A mobile node may change its location without losing connectivity and without changing its IP address; it may continue to communicate with other Internet nodes at any location using its (constant) IP address, assuming link-layer connectivity to a point of attachment is available. A mobile node is given a long-term home IP address on a home network. This home address is administered in substantially the same way as a "permanent" IP address is provided to a stationary host. A mobile node can change its point of attachment from one link to another, while still being reachable via its home address.

Mobile IP is described in specifications that may be found from the Internet Engineering Task Force, and the like. Briefly, however, Mobile IP enables the mobile node to be identified by its home address, regardless of its current point of attachment to the Internet. When the mobile node is away from the home network, it is also associated with a care-of-address, which provides information about the mobile node's current location. Typically, during a handover between access routers the care-of-address changes but the home address remains the same.

The term "link-layer," also referred to as data-link layer, or network interface layer, includes to a device driver within an operating system, and a corresponding network interface card, that are configured to enable physical interfacing to a network media, such as a cable, wireless media, or the like. The link-layer typically operates at layer 2 of the Open Systems Interconnection (OSI) reference model for networking.

The term "IP connectivity" refers to the ability to send and receive normal IP packets.

The term "signal" means at least one current signal, voltage signal, data signal, or packet signal.

The term "flow" refers to a flow of packets. The meaning of "a," "an," and "the" include plural references. The meaning of "in" includes "in" and "on."

Additionally, a reference to the singular includes a reference to the plural unless otherwise stated or is inconsistent with the disclosure herein.

Briefly stated, the present invention is directed to managing connectivity in a network by expediting the ability of a mobile node to send Internet Protocol (IP) packets subsequent to a handover. The mobile node is configured to determine an unconfirmed address for use on a new access router. The unconfirmed address may be obtained by way of a proxy router advertisement, a server, or the like, while connected to a current access router. Upon establishing a link-layer connection, and before establishing a network-layer connection with the new access router, the mobile node employs the unconfirmed address to send an IP packet to the new access router. If the new access router determines that the unconfirmed address conflicts with an existing address, the new access router provides a message to the mobile node indicating the conflict in addresses. In response to the message, the mobile node performs actions to resolve the address conflict. In one embodiment, the mobile node performs a duplicate address detection (DAD) to determine another address.

Employing the unconfirmed address to send packets is directed to reducing IP connectivity latencies that arise due to the round-trip times over a media interface that are typically incurred before the mobile node can employ its new IP address. Moreover, the present invention is directed to minimizing additional latencies by swapping a link frame type if it is determined that there is no address conflict. Since the link frame type is swapped, no additional packet bits are required, and no additional messages are proposed.

Illustrative Environment

FIG. 1 illustrates a block diagram generally showing an overview of one embodiment for a mobile system in which the present invention may operate. As shown in the figure, mobile system 100 includes network 102, and mobile node (MN) 108. Network 102 includes previous access router 104 and new access router 106. Mobile system 100 may include many more components than those shown in FIG. 1. However, the components shown are sufficient to disclose an illustrative embodiment for practicing the invention.

As further shown in the figure, MN 108 is, at some period of time, in communication with previous access router 104. As a handover occurs between access routers, MN 108 comes into communication with new access router 106. MN 108 may communicate with access router 104 and 106 through a radio access network (not shown) that is configured to transport information to and from devices capable of wireless communication.

Generally, MN 108 may include any device capable of connecting to a wireless network. Such devices include cellular telephones, smart phones, pagers, radio frequency (RF) devices, infrared (IR) devices, integrated devices combining one or more of the preceding devices, and the like. MN 108 may also include other devices that have a wireless interface, such as Personal Digital Assistants (PDAs), handheld computers, personal computers, multiprocessor systems, microprocessor-based or programmable consumer electronics, network PCs, wearable computers, and the like.

Network 102 can employ any form of computer readable media for communicating information from one electronic device to another. Network 102 can include local area networks (LANs), wide area networks (WANs), direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other link known to those skilled in the art. Furthermore, remote computers and other related electronic devices can be remotely connected to either LANs or WANs via a modem and temporary telephone link.

The media used to transmit information in the links illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Access routers 104 and 106 are described in more detail below in conjunction with FIG. 2. Briefly, however, access routers 104 and 106 are typically point of attachment devices on a communications network providing IP (packet-based) connectivity between MN 108 and other nodes on an IP network. On a single network linking many computers through a mesh of possible connections, access routers 104 and 106 receive transmitted messages and forward them to their correct destinations over available routes. On an interconnected set of LANs, including those of differing architectures and protocols, access routers 104 and 106 may act as bridges or links within LANs, enabling messages to be sent from one to another. Access routers 104 and 106 may perform dynamic routing actions that include identifying neighbors, configuring addresses, discovering routes, selecting routes, and maintaining routing information. Additionally, access routers 104 and 106 may provide neighbor discovery (ND) messages that support a handover of MN 108. For example, ND messages may be employed during handover to enable MN 108 to form a topologically correct IP address (through neighbor discovery) for use on new access router 106. Such ND messages may be communicated by employing an Internet Control Message Protocol (ICMP), Address Resolution Protocol (ARP), Reverse Address Resolution Protocol (RARP), or the like.

The present invention is directed to expediting the ability of MN 108 to send IP packets subsequent to the handover, by reducing delays in traditional neighbor discovery actions, and by employing an unconfirmed IP address to send IP packets as soon as link-layer connectivity is established. By employing an IP address that has not been confirmed to be unique address on new access router 106, the present invention eliminates several round-trip times over the media interface before MN 108 could otherwise employ the new IP address.

Neighbor discovery (ND) includes those actions that enable nodes, such as mobile nodes, access routers, and the like to determine addresses for neighbors known to reside on attached links. Neighbor discovery also includes actions to enable nodes to actively track which neighbors are reachable, and to detect changed addresses. Neighbor discovery employs various mechanisms to enable router discovery, address prefix discovery, address auto configuration, and resolution, as well as duplicate address detection (DAD).

The present invention enables MN 108 to employ an IP address that has not been confirmed, by establishing a newly defined link frame type. In one embodiment, the newly defined link frame type is called ND_FAST_HO. The newly defined link frame type is employed when the packet is submitted for transmission to new access router 106, to indicate that the IP address is not confirmed as valid.

Figure 2:
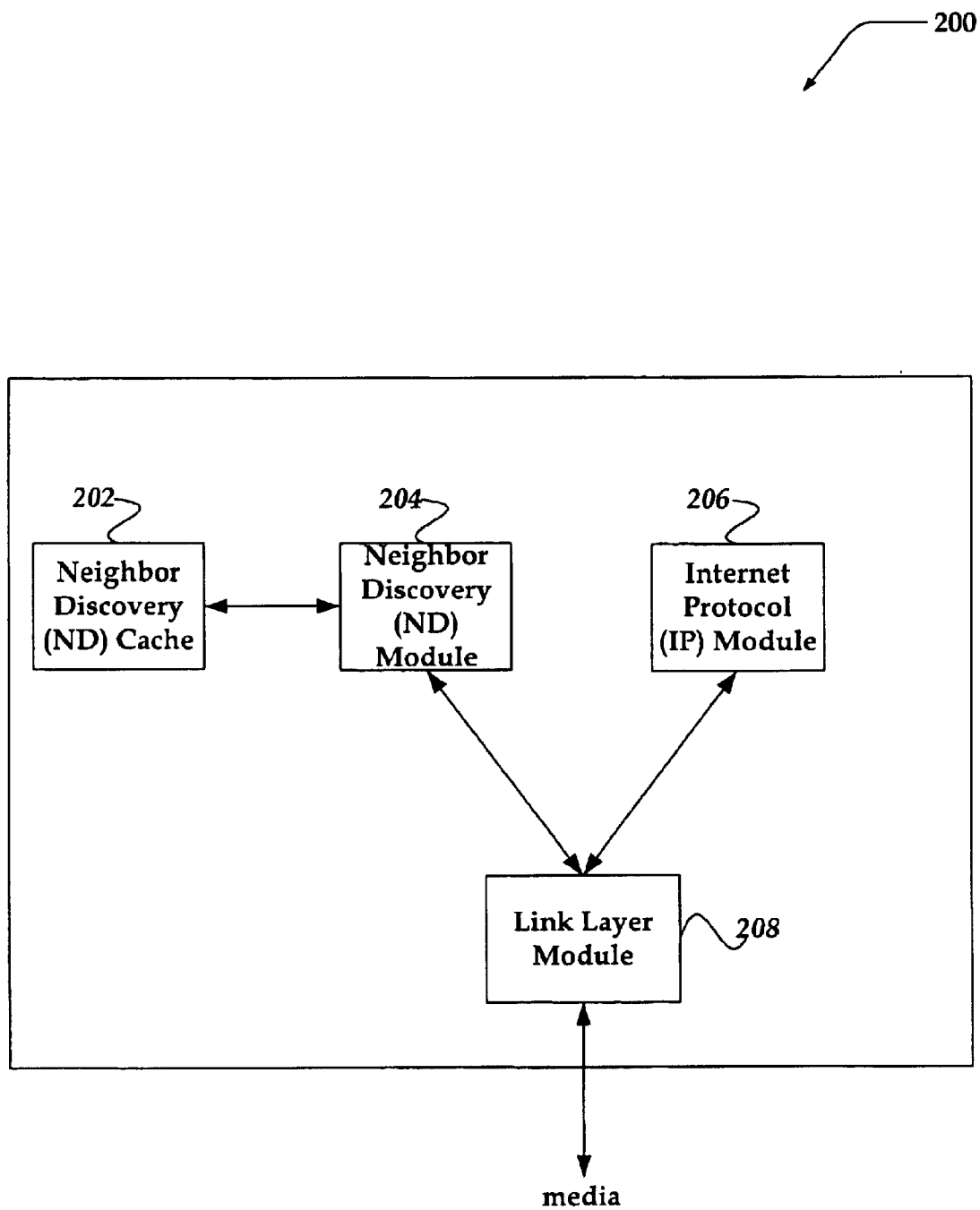
FIG. 2 illustrates a functional block diagram of one embodiment of an access router.

FIG. 2 illustrates a functional block diagram of one embodiment of an access router as shown in FIG. 1, for use in expediting neighbor discovery (ND). As shown in the figure, access router 200 includes link-layer module 208, neighbor discovery module 204, Internet Protocol (IP) module 206, and neighbor discovery (ND) cache 202. Link-layer module 208 is in communication with IP module 206, and ND module 204. ND module 204 is also in communication with ND cache 202.

Link-layer module 208 includes software and related hardware configured to enable sending and receiving of data packets, called frames, across a media. Link-layer module 208 also enables physical addressing, network topology, link error checking, ordered delivery of frames, and link flow control to ensure a frame is reliability communicated over the media. Link-layer module 208 is further configured to provide a received frame up a protocol stack where a header is removed, and information within the frame is examined, through a process known as demultiplexing.

Neighbor discovery (ND) cache 202 includes software and related hardware for storing information such as active IP addresses and their corresponding link-layer addresses employed on an interface of access router 200. ND cache 202 may employ a cache, Random Access Memory (RAM), a database, or the like, and software for managing the stored information.

Neighbor discovery (ND) module 204 includes software and related hardware configured to receive and send a packet to link-layer module 208 for communication with MN 108, or similar communicating entity. ND module 204 is enabled to examine the received packet and perform actions based upon a link frame type associated with the received packet. For example, if the link frame type associated with the received packet is ND_FAST_HO, ND module 204 determines that the communicating entity is attempting to employ an unconfirmed address. ND module 204 is configured to employ ND cache 202 to determine if an entry exists that matches the received unconfirmed address. ND module 204 is further configured to swap the link-frame type from ND_FAST_HO to an Internet Protocol (IP) type, if no match is determined. If a match is determined, ND module 204 is arranged to communicate an error message to MN 108 indicating that the IP address is already in use.

Internet Protocol (IP) module 206 includes software and related hardware configured to receive and send packets to link-layer module 208. For example, IP module 206 may receive a packet through link-layer module 208 from ND module 204, and prepare the received packet for further processing and routing.

Generalized Operation

Operationally, the present invention broadly includes two operations. The first operation enables an access router to perform actions substantially similar to a duplicate address detection (DAD) before the access router grants a new address to a mobile node. The second operation enables the mobile node that has obtained information associated with a new access router and IP address to send IP packets upon capturing link-layer connectivity with the new access router subsequent to handover.

Figure 3:
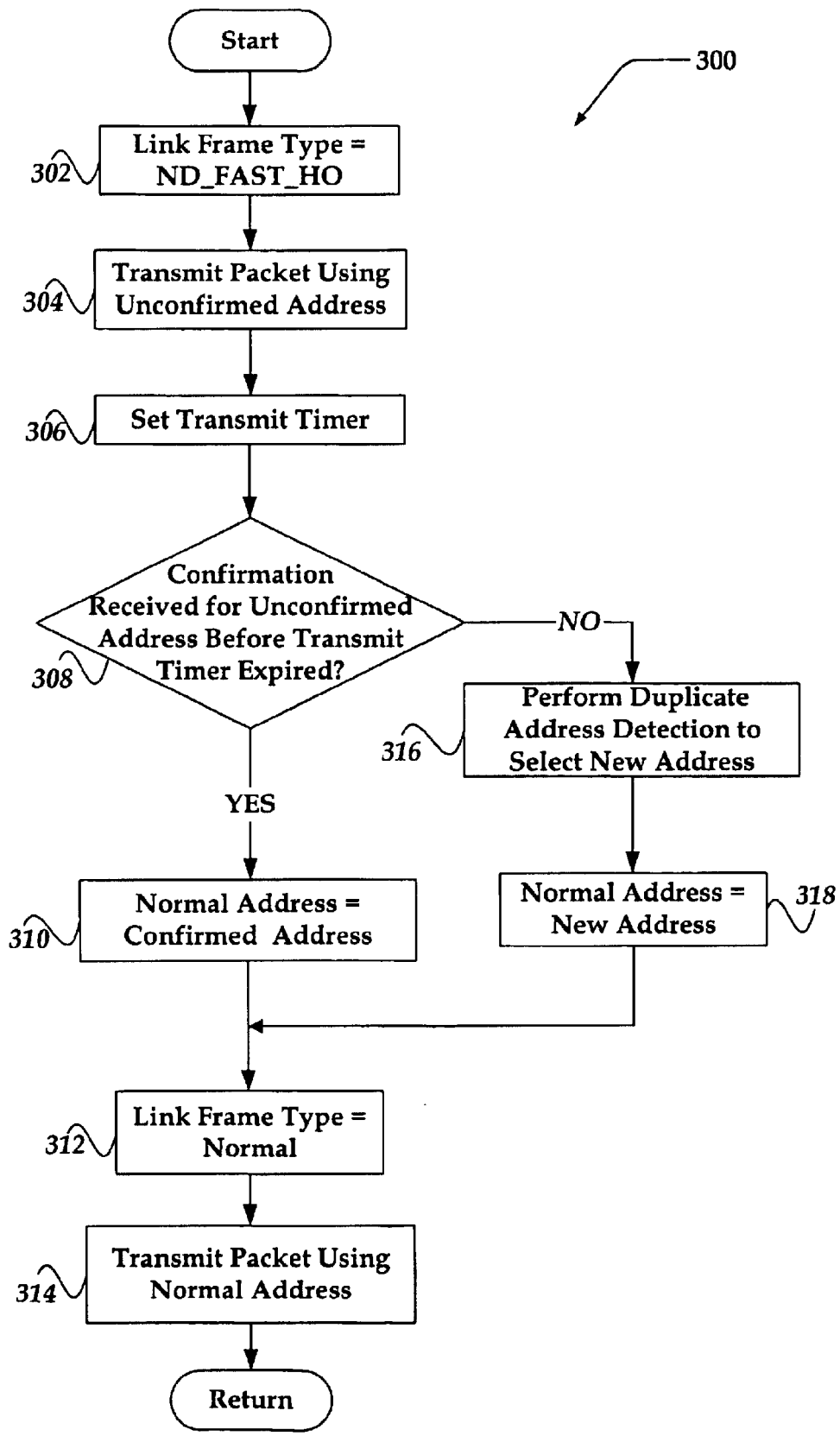
FIG. 3 illustrates a flow diagram generally showing one embodiment of a process for expediting IP packet communications subsequent to handover of a mobile node.

FIG. 3 illustrates a flow diagram generally showing one embodiment of a process for expediting IP packet communications subsequent to handover of a mobile node. Process 300 may be employed within mobile node 108 shown in FIG. 1.

Process 300 presumes that the mobile node has obtained information about the new access router and its prospective new IP address (an unconfirmed address). The mobile node may obtain information about the new access router and unconfirmed address for example through a proxy router advertisement, or the like, while connected to a previous access router prior to handover. Process 300 further presumes that the mobile node has established a link with the new access router, such that the mobile node has link-layer connectivity, but not IP connectivity with the new access router. Process 300 is entered when the mobile node intends to employ the unconfirmed address to send a packet.

As shown in FIG. 3, after a start block, the process moves to block 302, where a link frame type for a packet is set to ND_FAST_HO. The present invention is not however, limited to setting of a link frame type. For example, any other, field, indicator, or the like, may be employed to indicate that packet is associated with an unconfirmed address, without departing from the scope or spirit of the invention.

In one embodiment, an OPTIMISTIC flag is set ON, to acknowledge that the packet includes an unconfirmed address. The OPTIMISTIC is set ON when the mobile node has not received confirmation that the unconfirmed address is valid, such as during fast handovers.

Next, the process proceeds to block 304, where the packet associated with the unconfirmed address is transmitted to the new access router. The process then proceeds to block 306, where a transmit timer is set. The transmit timer enables the mobile node to perform subsequent actions should it not receive a response to the transmitted packet. Upon initializing the transmit timer, the process continues to decision block 308.

At decision block 308, a determination is made whether a confirmation is received for the unconfirmed address before the transmit timer expired. If it is determined that a confirmation is received before expiration of the transmit timer, the process proceeds to block 310. In one embodiment, a message is received similar to a unicast neighbor advertisement message, indicating that the unconfirmed address is valid for use on the new access router. At block 310, a normal address is set to the confirmed address for use in subsequent packets to the new access router.

Moreover, the OPTIMISTIC flag is set to OFF, so that subsequent packets may employ a normal link frame type. Upon completion of block 310, the process proceeds to block 312.

Alternatively, if at decision block 308, it is determined that a confirmation is not received before the transmit timer has expired, the process proceeds to block 316. Such a situation may arise, for example, where an error message is received that indicates the unconfirmed address is already in use on the new access router. In one embodiment, the error message is similar to a solicited neighbor advertisement message. In another situation, no packets, messages, or the like are received before the transmit timer expires. At block 316, the OPTIMISTIC flag is set to ERROR. Moreover, duplicate address detection actions are performed to select a new address that is not already employed on the new access router. Upon resolution of the conflict in addresses, the process proceeds to block 318, where the normal address is set to the new address. Moreover, the OPTIMISTIC flag is set to OFF, so that subsequent packets may employ a normal link frame type. Upon completion of block 318, the process proceeds to block 312.

At block 312, the link frame type is set to normal. The process then proceeds to block 314, where a packet is transmitted employing the normal address. Upon completion of block 314, the process returns to performing other actions.

Figure 4:
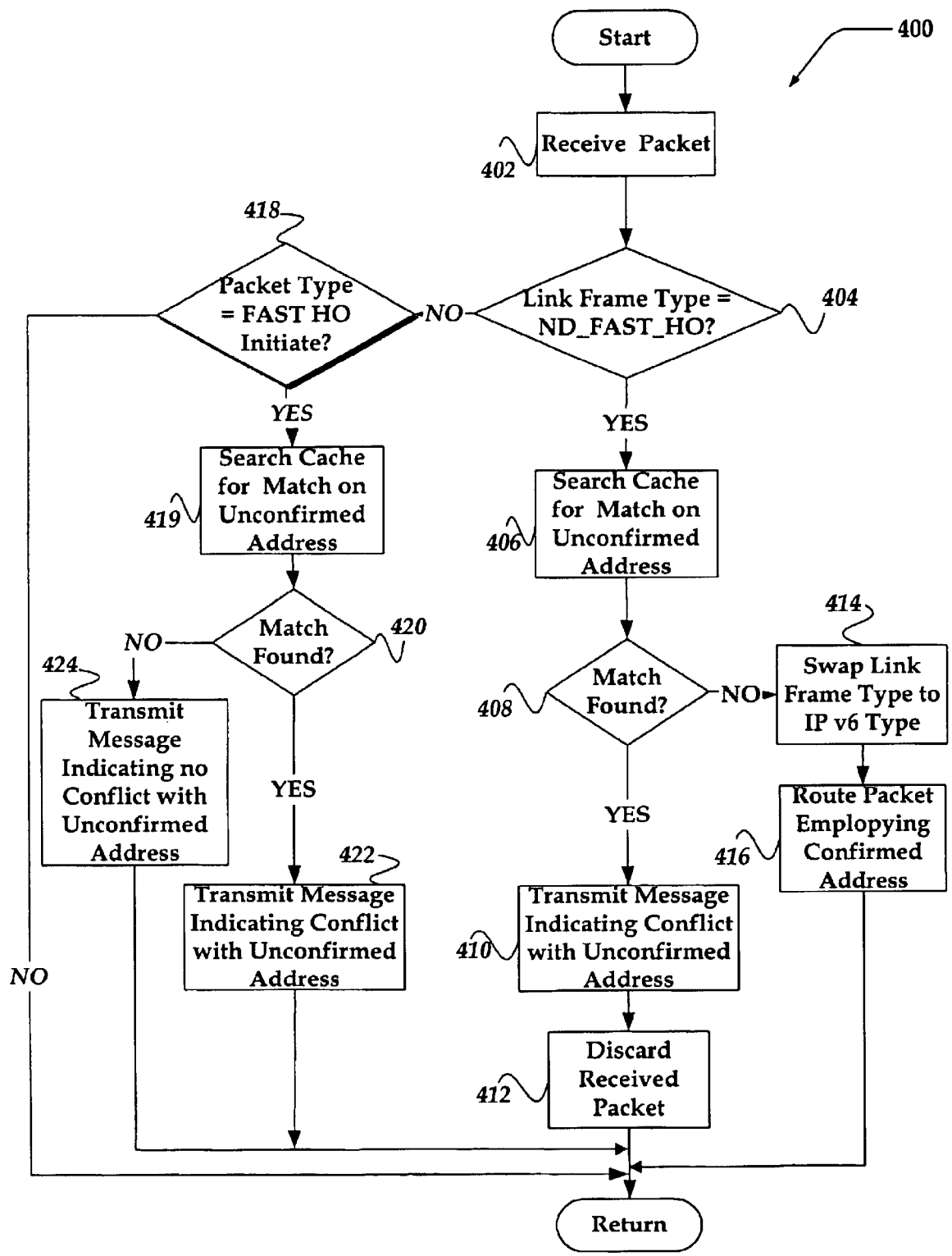
FIG. 4 illustrates a flow diagram generally showing one embodiment of a process for determining an address conflict, in accordance with aspects of the invention.

FIG. 4 illustrates a flow diagram generally showing one embodiment of a process for determining an address conflict on an access router, in accordance with aspects of the invention. Process 400 may be employed within new access router 106 shown in FIG. 1.

As shown in FIG. 4, after a start block, the process moves to block 402 where a packet is received from a requesting entity. The requesting entity may be a mobile node, or an access router that is involved in the mobile node's handover signaling. Next, the process flows to decision block 404, where a determination is made whether the packet is associated with a link frame type of ND_FAST_HO, or a similar mechanism that indicates the requesting entity intends to use an unconfirmed address. At decision block 404, if it is determined that the packet is not associated with a link frame type of ND_FAST_HO, the process proceeds to decision block 418, which is described further below.

Alternatively, if at decision block 404, it is determined that the packet is associated with the link frame type of ND_FAST_HO, the process proceeds to block 406, where a search is made on the unconfirmed address. The search may be performed by examining a neighbor discovery cache region, a database location, or the like, to determine whether there already exists a corresponding entry matching the unconfirmed address. The process then proceeds to decision block 408, where a determination is made whether a match of the unconfirmed entry has been found. A located match indicates that the unconfirmed address is already in use, and may not be employed by the requesting entity.

At decision block 408, if it is determined that a match is not found, and therefore the unconfirmed address is not already employed, the process proceeds to block 414. At block 414, the link frame type is swapped from ND_FAST_HO to an IP type. By swapping the link frame type, the present invention does not incur the overhead of additional packet bytes, or messages. Therefore, additional latencies may be minimized. Next, the process proceeds to block 416, where the modified packet is routed employing the newly confirmed address. By allowing the requesting entity to employ the unconfirmed address virtually upon establishing link-layer connectivity, a delay of about two round-trip times (RTTs) over the media interface may be eliminated. Upon completion of block 416, the process returns to performing other actions.

Alternatively, at decision block 408, if it is determined that a match is found indicating the unconfirmed address is already employed, the process proceeds to block 410, where an error message is communicated to the requesting entity indicating that the unconfirmed address is already employed. In one embodiment, the error message is substantially similar to a solicited neighbor advertisement message. In another embodiment, the error message is sent as a "Fast Handover Acknowledge message." The process continues to block 412, where the received packet is discarded. Upon completion of block 412, the process returns to performing other actions.

Back at decision block 418, a determination is made whether the current packet type is associated with a FAST__HO__Initiate, or a similar mechanism that indicates the requesting entity is requesting a fast initialization. If, at decision block 418, it is determined that the packet type is not associated with a FAST__HO__Initiate, the process returns to performing other actions.

Alternatively, at decision block 418, if it is determined that the current packet type is associated with a FAST__HO__Initiate, the process continues to block 419, where a search is made on the unconfirmed address. The search is performed substantially as described at block 406, above. The process then proceeds to decision block 420, where a determination is made whether a match of the unconfirmed entry has been found. A located match indicates that the unconfirmed address is already in use, and may not be employed by the requesting entity.

At decision block 420, if it is determined that a match is not found, and therefore the unconfirmed address is not already employed, the process proceeds to block 424. At block 424, a message is communicated to the requesting entity indicating that no conflict is determined to exist with the unconfirmed address. In one embodiment, the error message is sent as a "Fast Handover Acknowledge message." The process then returns to performing other actions.

Alternatively, at decision block 420, if it is determined that a match is found indicating the unconfirmed address is already employed, the process proceeds to block 422, where an error message is communicated to the requesting entity indicating that the unconfirmed address is already employed. Upon completion of block 422, the process returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus for managing connectivity in a network, comprising:
   (a) a network interface that employs a packet-based protocol to send and receive packets;
   (b) a mobile node configured to perform actions, including:
      determining an unconfirmed address; and
      if the mobile node is handed over to a router, and a network-layer connection is unestablished with the router, employing the network interface to provide a packet including the unconfirmed address to the router, wherein the mobile node singularly confirms the use of the unconfirmed address.

2. The apparatus of claim 1, wherein the mobile node is further configured to perform actions, including:
   receiving a message in response to the provided packet; and
   if the message indicates that the unconfirmed address associated with the packet is already in use, determining another address.

3. The apparatus of claim 2, wherein determining another address further comprises performing a duplicate address detection.

4. The apparatus of claim 1, wherein the mobile node is further configured to perform actions, including:
   determining if a timer is expired before a response to the provided packet is received; and
   if the timer is expired before the response is received, determining another address.

5. The apparatus of claim 1, wherein determining the unconfirmed address further comprises receiving information associated with the unconfirmed address from at least one of a proxy router advertisement, and a server.

6. The apparatus of claim 1, wherein the router is an access router.

7. An apparatus for managing connectivity in a network, comprising:
   (a) a network interface that employs a packet-based protocol to send and receive packets;
   (b) a mobile node configured to perform actions, including:
      determining an unconfirmed address by receiving information associated with the unconfirmed address from at least one of a proxy router advertisement, and a Dynamic Host Configuration Protocol server; and
      if the mobile node is handed over to a router, and a network-layer connection is unestablished with the router, employing the network interface to provide a packet including the unconfirmed address to the router, wherein the mobile node singularly confirms the use of the unconfirmed address.

8. An apparatus for managing connectivity in a network, comprising:
   (a) a network interface that employs a packet-based protocol to send and receive packets;

(b) a mobile node configured to perform actions, including:
  determining an unconfirmed address; and
  if the mobile node is handed over to a router, and a network-layer connection is unestablished with the router, employing the network interface to provide a packet including the unconfirmed address to the router, wherein the mobile node singularly confirms the use of the unconfirmed address, and wherein the packet comprises an indicator representing that the packet includes an unconfirmed address.

9. The apparatus of claim 8, wherein the indicator is a link frame type configured to indicate a fast handover.

10. An apparatus for managing connectivity in a network, comprising:
  (a) a network interface configured to send and receive packets;
  (b) a router configured to enable a mobile node to connect to the network, wherein the router performs actions, including:
    receiving a packet from the mobile anode over the network interface before a network-layer connection is established with the mobile node and during a handover, wherein the packet is associated with an unconfirmed address;
    determining if the unconfirmed address conflicts with another address; and
    if the unconfirmed address conflicts with another address, providing a message to the mobile node, wherein responding to the message the mobile node configures a different address.

11. The apparatus of claim 10, wherein determining if the unconfirmed address conflicts with another address further comprises determining if an entry in a memory location already exists that matches the unconfirmed address.

12. The apparatus of claim 10, wherein determining a different address further comprises performing a duplicate address detection.

13. The apparatus of claim 10, wherein providing the message to the mobile node further comprises using a protocol selected from one of an Internet Control Message Protocol (ICMP), an Address Resolution Protocol (ARP), a Neighbor Discovery (ND), an Inverse Neighbor Discovery (ND), and a Reverse Address Resolution Protocol (RARP).

14. An apparatus for managing connectivity in a network, comprising:
  (a) a network interface configured to send and receive packets;
  (b) a router configured to enable a mobile node and during a handover to connect to the network, wherein the router performs actions, including:
    receiving a packet from the mobile node over the network interface before a network-layer connection is established with the mobile node, wherein the packet is associated with an unconfirmed address;
    determining if the unconfirmed address conflicts with another address; and
    if the unconfirmed address conflicts with another address, providing a neighbor discovery message to the mobile node, wherein responding to the message the mobile node configures a different address.

15. An apparatus for managing connectivity in a network, comprising:
  (a) a network interface configured to send and receive packets;
  (b) a router configured to enable a mobile node to connect to the network, wherein the router performs actions, including:
    receiving a packet from the ode over the network interface before a network-layer connection is established with the mobile node and during a handover, wherein the packet comprises an indicator representing that the packet is associated with an unconfirmed address;
    determining if the unconfirmed address conflicts with another address; and
    if the unconfirmed address conflicts with another address, providing a message to the mobile node, wherein responding to the message the mobile node configures a different address.

16. The apparatus of claim 15, wherein the indicator is a link frame type configured to indicate a fast handover.

17. A system for managing connectivity in a network, comprising:
  (a) a network interface configured to send arid receive packets;
  (b) a mobile node configured to perform actions, including:
    (i) determining an unconfirmed address;
    (ii) providing a packet associated with the unconfirmed address over the network interface;
  (c) a router configured to perform actions, including:
    (i) establishing link-layer connectivity with the mobile node;
    (ii) if network-layer connectivity is unestablished with the mobile node, receiving the packet associated with the unconfirmed address from the mobile node before;
    (iii) determining if the unconfirmed address conflicts with another address; and
    (iv) if the unconfirmed address conflicts with another address, providing a message to the mobile node, wherein the mobile node determines a different address in response to the message.

18. The system of claim 17, wherein determining the different address further comprises performing a duplicate address detection.

19. The system of claim 17, wherein determining if the unconfirmed address conflicts with another address further comprises determining if an entry in a memory location already exists that approximately matches the unconfirmed address.

20. The system of claim 17, wherein the mobile node is further configured to perform actions, including if a timer is expired before the message from the router is received, determining another address.

21. A system for managing connectivity in a network, comprising:
  (a) a network interface configured to send and receive packets;
  (b) a mobile node configured to perform actions, including:
    (i) determining an unconfirmed address, in part, by determining an address from information received from at least one of a proxy router advertisement, and a server;
    (ii) providing a packet associated with the unconfirmed address over the network interface;
  (c) a router configured to perform actions, including:
    (i) establishing link-layer connectivity with the mobile node;
    (ii) if network-layer connectivity is unestablished with the mobile node, receiving the packet associated with the unconfirmed address from the mobile node before;

(iii) determining if the unconfirmed address conflicts with another address; and (iv) if the unconfirmed address conflicts with another address, providing a message to the mobile node, wherein the mobile node determines a different address in response to the message.

22. The system of claim 21, wherein the server is a Dynamic Host Configuration Protocol server.

23. The system of claim 21, wherein the packet further comprises an indicator representing that the packet is associated with an unconfirmed address.

24. The system of claim 23, wherein the indicator is a link frame type configured to indicate a fast handover.

25. The system of claim 21, wherein the mobile node is further configured to perform actions, including:

if the packet is associated with the unconfirmed address, setting a flag to indicate that the packet is associated with the unconfirmed address;

if a timer is expired before the message from the router is received, setting the flag to indicate an error; and if the router provides a message to the mobile node that is associated with a confirmed address, setting the flag to indicate that a subsequent packet is a normal link frame type.

26. A method for managing connectivity in a network, comprising:

establishing a link-layer connection between a router and a requesting entity in the network;

providing a packet to the router before a network-layer connection is established between the router and a mobile node and during a handover, wherein the packet includes an unconfirmed address;

receiving the packet associated with the unconfirmed address from the requesting entity; and if the unconfirmed address conflicts with another address, providing a message to the requesting entity, wherein the requesting entity is enabled to inform the mobile node to employ a different address in response to the message.

27. The method of claim 26, wherein determining a different address further comprises performing a duplicate address detection.

28. The method of claim 26, wherein providing the message to the requesting entity further comprises using a protocol selected from one of an Internet Control Message Protocol (ICMP), an Address Resolution Protocol (ARP), a Neighbor Discovery (ND), an Inverse Neighbor Discovery (IND), and a Reverse Address Resolution Protocol (RARP).

29. The method of claim 26, wherein the requesting entity is at least one of a mobile node, and another router.

30. A method for managing connectivity in a network, comprising:

establishing a link-layer connection between a router and a requesting entity in the network;

providing a packet to the router before a network-layer connection is established between the router and a mobile node and during a handover, wherein the packet includes an unconfirmed address and wherein the packet further comprises an indicator representing that the packet is associated with an unconfirmed address;

receiving the packet associated with the unconfirmed address from the requesting entity; and if the unconfirmed address conflicts with another address, providing a message to the requesting entity, wherein the requesting entity is enabled to inform the mobile node to employ a different address in response to the message.

31. The method of claim 30, wherein the indicator is a link frame type configured to indicate a fast handover.

* * * * *

UNITED STATES PATENT AND TRADEMARK OFFICE
CERTIFICATE OF CORRECTION

PATENT NO. : 6,930,988 B2
DATED : August 16, 2005
INVENTOR(S) : Rajeev Koodli et al.

It is certified that error appears in the above-identified patent and that said Letters Patent is hereby corrected as shown below:

Column 11,
Line 20, delete "anode" and insert -- node --.
Line 42, delete "(ND)" and insert -- (IND) --.
Line 49, after "node" delete "and during a handover".
Lines 48 and 49, after "node" insert -- and during a handover --.
Line 65, delete "ode" and insert -- mobile node --.

Column 12,
Line 16, delete "arid" and insert -- and --.

Signed and Sealed this

Twentieth Day of December, 2005

JON W. DUDAS
*Director of the United States Patent and Trademark Office*